US012546158B2

(12) United States Patent
Seadia

(10) Patent No.: US 12,546,158 B2
(45) Date of Patent: Feb. 10, 2026

(54) AUTOMATIC DOOR CONTROL

(71) Applicant: GREENSHPON ENGINEERING WORKS LTD., Misgav (IL)

(72) Inventor: Shimon Seadia, Zefat (IL)

(73) Assignee: GREENSHPON ENGINEERING WORKS LTD., Misgav (IL)

( * ) Notice: Subject to any disclaimer, the term of this patent is extended or adjusted under 35 U.S.C. 154(b) by 1523 days.

(21) Appl. No.: 16/965,302

(22) PCT Filed: Jan. 29, 2019

(86) PCT No.: PCT/IL2019/050112
§ 371 (c)(1),
(2) Date: Jul. 28, 2020

(87) PCT Pub. No.: WO2019/145962
PCT Pub. Date: Aug. 1, 2019

(65) Prior Publication Data
US 2021/0115723 A1 Apr. 22, 2021

Related U.S. Application Data

(63) Continuation of application No. 15/881,970, filed on Jan. 29, 2018, now abandoned.

(51) Int. Cl.
*E05F 15/70* (2015.01)
*E05F 15/71* (2015.01)
(Continued)

(52) U.S. Cl.
CPC .............. *E05F 15/70* (2015.01); *E05F 15/71* (2015.01); *E06B 9/70* (2013.01); *E06B 9/90* (2013.01);
(Continued)

(58) Field of Classification Search
CPC .. E05F 15/70; E05F 15/71; E06B 9/70; E06B 9/90; E06B 2009/6809; E06B 2009/6818;
(Continued)

(56) References Cited

U.S. PATENT DOCUMENTS 5,051,672 A * 9/1991 Yaguchi ............... H02H 7/0851 318/434
6,449,981 B1 * 9/2002 Ueda .................. B60H 1/00835 251/145
(Continued)

FOREIGN PATENT DOCUMENTS

CN 102296901 12/2011
CN 103541622 1/2014
(Continued)

OTHER PUBLICATIONS

Office Action for U.S. Appl. No. 15/881,970 dated Mar. 28, 2019.
International Search Report for PCT Application No. PCT/IL2019/050112 dated May 16, 2019.

*Primary Examiner* — Jorge L Carrasquillo
(74) *Attorney, Agent, or Firm* — Brian D. Kaul; Westman, Champlin & Koehler, P.A.

(57) ABSTRACT

An automatic door opening system includes an element that is rotatable to change a position of a door. A potentiometer is coupled to the element such that rotation of the element in one direction increases a resistance of the potentiometer and rotation of the element in the opposite direction decreases the resistance. A controller is configured to rotate the element concurrently with monitoring the resistance of the potentiometer, and stop the rotation when the resistance of the potentiometer is indicative of a target position of the door.

21 Claims, 4 Drawing Sheets

(51) Int. Cl.

| | |
|---|---|
| ***E06B 9/70*** | (2006.01) |
| ***E06B 9/90*** | (2006.01) |
| ***H02P 3/06*** | (2006.01) |
| *E06B 9/68* | (2006.01) |

(52) U.S. Cl.
CPC .......... *H02P 3/06* (2013.01); *E05Y 2900/132* (2013.01); *E05Y 2900/146* (2013.01); *E06B 2009/6809* (2013.01); *E06B 2009/6818* (2013.01); *E06B 2009/6872* (2013.01)

(58) Field of Classification Search
CPC ............... E06B 2009/6872; H02P 3/06; E05Y 2900/132; E05Y 2900/146
USPC .......................................................... 318/261
See application file for complete search history.

(56) References Cited

U.S. PATENT DOCUMENTS

| | | | | |
|---|---|---|---|---|
| 6,891,479 | B1 | 5/2005 | Eccleston | |
| 10,718,150 | B2 * | 7/2020 | Hall | E05F 15/77 |
| 2007/0114956 | A1 * | 5/2007 | Hashimoto | H02P 4/00 318/139 |
| 2008/0185229 | A1 * | 8/2008 | Panzarella | B60N 2/06 187/200 |
| 2010/0228447 | A1 * | 9/2010 | Serban | E05F 15/41 701/49 |
| 2013/0015229 | A1 | 1/2013 | Viola | |
| 2016/0024831 | A1 * | 1/2016 | Houser | E05F 15/63 49/506 |
| 2017/0081917 | A1 * | 3/2017 | Brunk | E06B 9/72 |
| 2017/0261069 | A1 | 9/2017 | Seadia | |

FOREIGN PATENT DOCUMENTS

| | | | |
|---|---|---|---|
| JP | 4117337 | B1 * | 7/2007 |
| JP | 2017-166304 | | 9/2017 |

* cited by examiner

AUTOMATIC DOOR CONTROL

CROSS-REFERENCE TO RELATED APPLICATIONS

This application is a National Phase Application of PCT International Application No. PCT/IL2019/050112, International Filing Date Jan. 29, 2019, claiming priority of U.S. patent application Ser. No. 15/881,970, filed Jan. 29, 2018, which is hereby incorporated by reference.

FIELD OF THE INVENTION

The present invention relates to door systems. More particularly, the present invention relates to an automatic door control.

BACKGROUND OF THE INVENTION

An automatic door system may be configured to control the opening and closing of a door or shutter in accordance with one or more predetermined conditions, circumstances, or criteria. For example, the opening or closing the door or shutter may be intended to regulate a temperature inside a structure. In particular, enclosures where livestock or poultry are kept may require precise automatic temperature regulation in order to ensure the wellbeing and productivity of the animals. Similarly, shutters or windows of greenhouses may also require similar control in order to ensure proper growing conditions. Conditions that determine when and by how much a door or shutter is to be opened or closed may include time of day, direction or brightness of incident sunlight, wind conditions, temperature or humidity inside or outside of the structure, or other conditions.

Typically, the automatic door system includes a gearbox in order to transform a motion of one type that is produced by a motor to another type of motion of a load, e.g., the door or shutter. For example, the transformation may include a change in direction of motion, type of motion (e.g., circular or linear), speed of motion, or any combination of the above. The gearbox may include one or more types of gears, each gear being characterized by a gear ratio. A gear ratio may be selected in accordance with the power output of the motor and the force that is to be applied to the load. For example, in some cases a gear box may enable a motor to raise or lower a roller shutter or roller door.

SUMMARY OF THE INVENTION

There is thus provided, in accordance with an embodiment of the present invention, an automatic door opening system including: an element that is rotatable to change a position of a door; a potentiometer that is coupled to the element such that rotation of the element in one direction increases a resistance of the potentiometer and rotation of the element in the opposite direction decreases the resistance; and a controller that is configured to rotate the element concurrently with monitoring the resistance of the potentiometer, and to stop the rotation when the resistance of the potentiometer is indicative of a target position of the door.

Furthermore, in accordance with an embodiment of the present invention, the element includes a shaft.

Furthermore, in accordance with an embodiment of the present invention, a housing of the controller includes an opening to enable an end of the shaft to extend into the housing.

Furthermore, in accordance with an embodiment of the present invention, the end of the shaft includes a pulley wheel and a shaft of the potentiometer is provided with a pulley wheel, the rotatable element being coupled to the potentiometer by a pulley belt.

Furthermore, in accordance with an embodiment of the present invention, the system includes at least one sensor.

Furthermore, in accordance with an embodiment of the present invention, the controller is configured to select the target position based on a signal from the at least one sensor.

Furthermore, in accordance with an embodiment of the present invention, the sensor is configured to sense an environmental condition.

Furthermore, in accordance with an embodiment of the present invention, the environmental condition includes an interior or exterior temperature or an interior or exterior humidity.

Furthermore, in accordance with an embodiment of the present invention, the system is configured to stop rotation of the rotatable element in response to a signal from the at least one sensor.

Furthermore, in accordance with an embodiment of the present invention, the signal is indicative of faulty operation of the system.

Furthermore, in accordance with an embodiment of the present invention, the system includes an encoder for sensing a rotation of the element.

Furthermore, in accordance with an embodiment of the present invention, the controller is further configured to rotate the element when a signal that is generated by the encoder is indicative of a target position of the door Furthermore, in accordance with an embodiment of the present invention, the controller is provided with a nonvolatile data storage that is configured to store a correlation between a target position of the door and a resistance of the potentiometer.

Furthermore, in accordance with an embodiment of the present invention, the controller is configured to receive a signal during execution of a calibration method, the signal indicating that a current resistance of the potentiometer corresponds to the target position.

Furthermore, in accordance with an embodiment of the present invention, the controller is configured for wireless communication wirelessly with an external device.

Furthermore, in accordance with an embodiment of the present invention, the wireless communication includes Bluetooth or Wi-Fi.

Furthermore, in accordance with an embodiment of the present invention, the external device includes a smartphone.

Furthermore, in accordance with an embodiment of the present invention, the wireless communication is configured to enable an operator or the external device to indicate a correlation between a current resistance of the potentiometer and the target position of the door.

There is further provided, in accordance with an embodiment of the present invention, a method for operation of an automatic system for changing a position of a door, the method including, by a controller: receiving input from a sensor; when the input is indicative of changing the position of the door to a target position: operating a motor to rotate a rotatable element in one direction to open the door, or in an opposite direction to close the door; concurrently with operating the motor, receiving a reading of a potentiometer that is coupled to the rotatable element rotation, where rotation of the element in one direction increases a resistance of the potentiometer and rotation of the element in the opposite direction decreases the resistance; and stopping the rotation when the resistance of the potentiometer is indicative of the target position of the door.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1A:
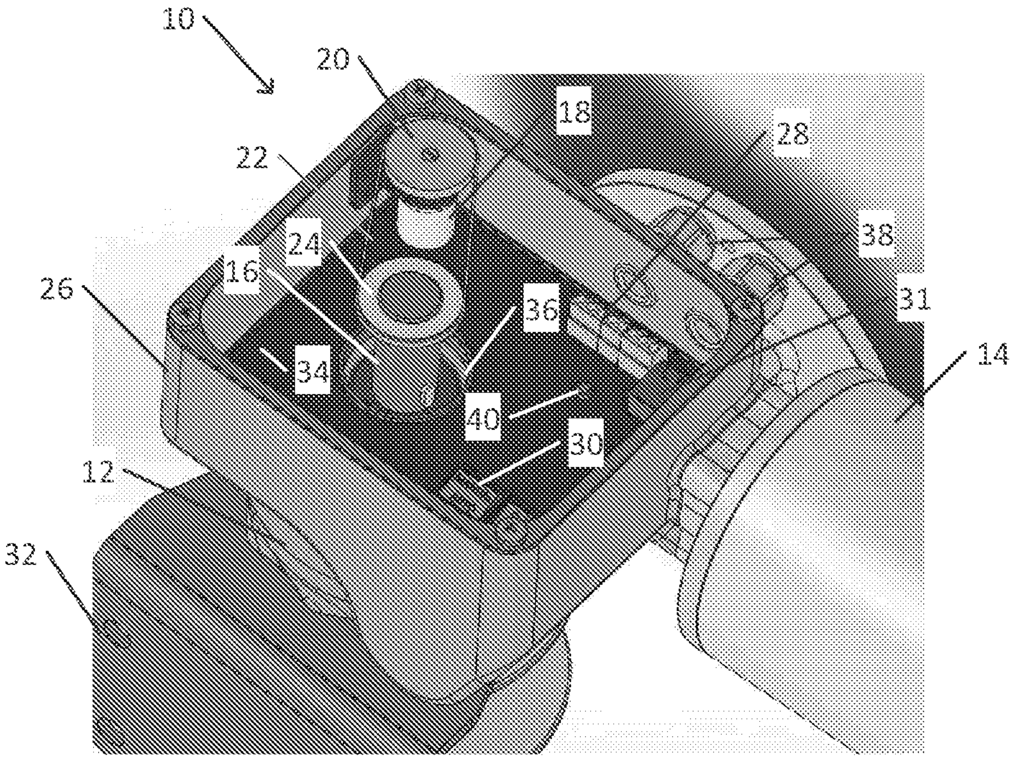
FIG. 1A schematically illustrates an automatic door control, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing." "computing." "calculating." "determining," "establishing", "analyzing". "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a controller for operating a door is configured to cause the door to open or close in accordance with predetermined criteria. For example, the door control may include an electronic processor or circuitry that (e.g., a microprocessor or micro-controller) that is configured to cause the door to open or close through a distance that is determined in response to one or more preprogrammed conditions. In some cases, the door control may operate in addition to, and independently of, a manual control of the door. Although in the following discussion reference is made to a door and to opening or closing of a door, the term "door" should be understood as including any type of door, screen, shutter, window, vent, damper, or other feature of a structure that may be opened or closed by an automatic motorized mechanism.

The mechanism for opening and closing the door may include at least one rotatable element. For example, an electric motor may be configured to rotate, typically via a transmission that may include a gear box, one or more shafts whose rotation results in the opening or closing of the door. For example, the door may include a roller door or roller shutter that is configured to wrap around an axle of the door when the door is opening, and to unwrap from the axle when the door is closing. Alternatively or in addition, a mechanism for opening or closing the door may include one or more rotating pulleys, belts, or gears for lifting or lowering the door, for horizontally sliding the door, or for otherwise opening or closing the door.

A potentiometer is coupled to a rotatable element (e.g., axle, shaft, pulley wheel, gear, or other rotatable element) of a mechanism for opening and closing the door. The rotatable element may be directly coupled to the door such that a given total angle of rotation (e.g., that may have a value in excess of a full rotation of 360°, due to multiple rotations) of the rotatable element is unambiguously indicative of the position of the door (e.g., assuming that the door and operation mechanism is physically intact). For example, a shaft that is connected to a wiper or sliding contact of the potentiometer may be coupled to the rotatable element of the mechanism via a pulley, belt, gear, or otherwise. Thus, rotation of the rotatable element in one direction may increase resistance of the potentiometer (e.g., between an end of a resistor of the potentiometer and the sliding contact), while rotation in the opposite direction may decrease the resistance of the potentiometer. Circuitry of the controller may be configured to determine a current configuration position of the potentiometer by measuring a current electrical resistance of the potentiometer.

Use of a potentiometer to measure a current configuration of the door (e.g., open, closed, or an extent to which the door is partially open) may be advantageous over other ways of measuring the door position. For example, such other techniques may include use of an optical or magnetic encoder to measure movement from a starting position, use of proximity or rangefinder sensors, or other techniques.

For example, use of the potentiometer may enable automatic "wake up" and recovery after a power failure. When the electrical power supply is interrupted and the rotatable element does not rotate, the shaft of the potentiometer may remain in place such that the resistance of the potentiometer remains unchanged. Thus, the controller may immediately detect a position of the door after electrical power is restored. Since the resistance of the potentiometer is directly or indirectly mechanically linked to the door position, resumption of operation may continue immediately (e.g., without requiring a process of fully opening or closing in order to reacquire a zero or starting position, or without relying on a stored relative position. In addition, use of a potentiometer, e.g., that is enclosed in a box of the system, may enable a simpler and more robust system (e.g., less likely to be affected by dirt, electrical power surges or spikes, or environmental conditions) than one based on another measurement technique.

A processor may be configured to operate the door to fully or partially open or close in accordance to an indicated current position of the door and one or more other conditions. For example, the processor may be configured to receive signals from one or more sensors and operate the door in accordance with one or more sensed conditions. Such conditions may include, for example, temperature, relative humidity, wind velocity, time of day, insolation, or other conditions. While operating the door, the current position of the door is monitored by measuring the electrical resistance of the potentiometer. When the door is opened or closed to a target position, operation of the drive motor may stop.

One or more conditions or door positions may be programmed remotely. For example, the processor may be provided with a capability to communicate with one or more types of devices via one or more communications channels. Such channels may include Wi-Fi. Bluetooth, a mobile telephone network, the internet, or another communications channel. An operator of a remote device, such as a smartphone, portable or stationary computer, or other remoted device, may communicate with the processor to provide one or more parameters or conditions for programmed instructions for automatically operating the door.

The relationship between potentiometer resistance and door position may be calibrated. For example, the door may be manually operated to one or more predetermined or standard positions (e.g., fully open, fully closed, one or more intermediate positions). When the door is at one of the predetermined positions, the remote device may be operated to indicate that the door is at that position. The potentiometer resistance may then be measured and stored on a data storage device as indicative of that door position. Alternatively or in addition, one or more contact switches or other sensors may be provided to detect one or more positions of the door (e.g., fully open, fully closed, or one or more intermediate positions). A calibration procedure may utilize these door position sensors in order to automatically relate a measured potentiometer resistance with one or more door positions.

Figure 1B:
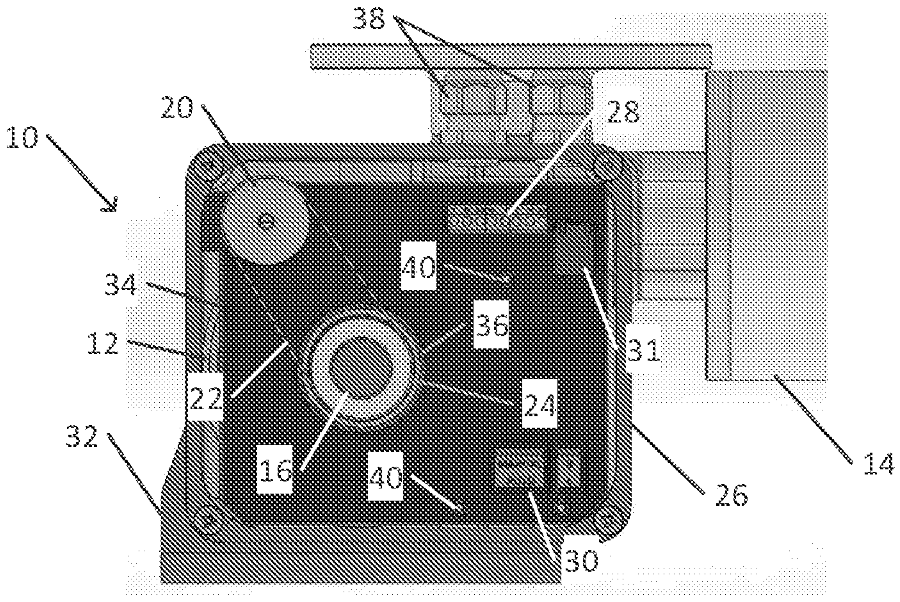
FIG. 1B is a schematic top view of the automatic door control shown in FIG. 1A.
Figure 2:
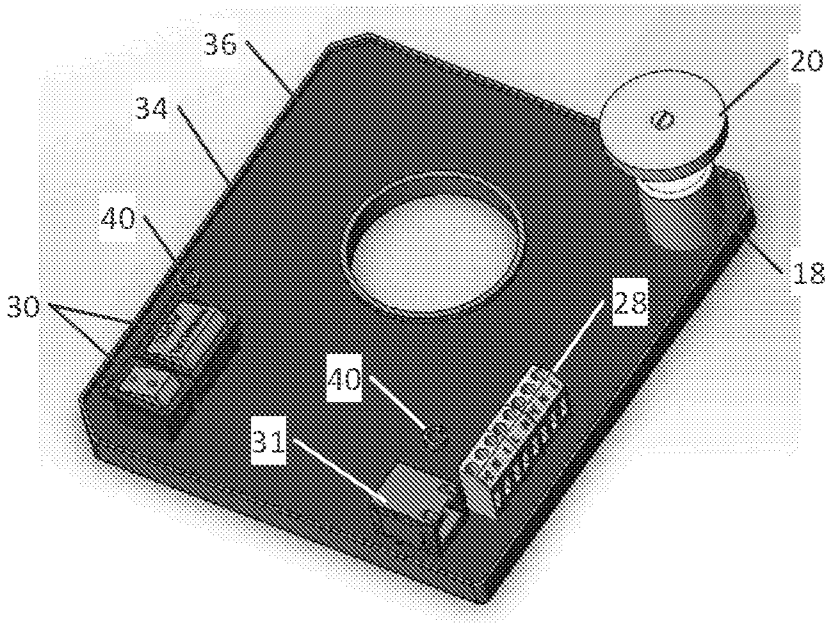
FIG. 2 schematically illustrates a limiter card of the automatic door control shown in FIG. 1A.

FIG. 1A schematically illustrates an automatic door control, in accordance with an embodiment of the present invention. FIG. 1B is a schematic top view of the automatic door control shown in FIG. 1A. FIG. 2 schematically illustrates a limiter card of the automatic door control shown in FIG. 1A.

Automatic door control 10 is configured to be mounted on transmission 12 of a door mechanism. Transmission 12 may include a gearbox or other components for transmitting torque from one or more drive motors 14 to main transmission shaft 16. For example, main transmission shaft 16 may include a shaft whose rotation opens or closes a door. For example, main transmission shaft 16 may include an axle of a roller door, a shaft for driving a pulley wheel or gear that moves a door (e.g., upward or downward, or horizontally), an axis about which a door may be rotated, or that otherwise opens or closes a door. Typically, rotation of main transmission shaft 16 in one direction about its axis causes the door to open, while rotation of main transmission shaft 16 in the opposite direction causes the door to close.

Control housing 26 may be configured to fit on transmission 12, e.g., on a gearbox of transmission 12. For example, control housing 26 may be provided with one or more mounting brackets 32. Control housing 26 may be closed with a cover to completely enclose components of automatic door control 10. Thus, automatic door control 10 may be able to function in dirty or dusty environments (e.g., in or on a henhouse or other agricultural structure).

Automatic door control 10 is configured to generate a position signal that is indicative of a current angular position of main transmission shaft 16, and thus of the door that is controlled by automatic door control 10. Typically, main transmission shaft 16 may rotate more than one full rotation during fully opening the door from a closed position, or during closing the door from a fully open position. In such a case, the position signal generated by automatic door control 10 may be indicative of rotation angles greater than 360°.

In the example shown, main transmission shaft 16 provided with shaft pulley wheel 24 that rotates together with main transmission shaft 16. For example, shaft pulley wheel 24 may be mounted at an end of main transmission shaft 16. Potentiometer 18 is similarly provided with potentiometer pulley wheel 20 that is connected to a shaft of potentiometer 18. Thus, rotation of potentiometer pulley wheel 20 may rotate a wiper or sliding contact within potentiometer 18, thus changing the resistance between two contacts on potentiometer 18. In order to enable measurement of rotation angles greater than 360°, potentiometer 18 may be a multi-turn potentiometer.

In the example shown, potentiometer pulley wheel 20 is coupled to shaft pulley wheel 24 by pulley belt 22. For example, pulley belt 22 may include a rubber or plastic belt or loop. A ratio of turns of potentiometer pulley wheel 20 to turns of shaft pulley wheel 24 may depend on the ratio of the diameters of shaft pulley wheel 24 and of potentiometer pulley wheel 20. Alternatively or in addition, main transmission shaft 16 may be coupled to potentiometer 18 by one or more gears, chains, or other coupling mechanisms.

In some cases, potentiometer 18 may be mounted on a control card 34. Control card 34 may be configured to be mounted within control housing 26, e.g., using card mounting structure 40. For example, card mounting structure 40 may include one or more screw holes, or other structure. In some cases, at least one mounting structure 40 may be metalized or otherwise made to be electrically conducting, and may be connectable to a grounded component of control housing 26 or another structure on which control housing 26 is mounted, or to which is otherwise connected.

Control card 34 may include a shaft opening 36 to enable main transmission shaft 16 and shaft pulley wheel 24 (e.g., an end of main transmission shaft 16 to which shaft pulley wheel 24 is mounted) to extend into the interior of control housing 26.

Control card 34 may include a plurality of interconnections that enable flow of electric current between various components that are mounted on control card 34. Components of control card 34 may include one or more switches 30. For example, switches 30 may include a power on-off switch, a manual mode/automatic mode selector, or other switches.

Control card 34 may include one or more electrical connectors 28 to enable electrical connection to one or more external devices. For example, electrical connectors 28 may enable connecting control card 34 to one or more of an external power supply (e.g., line voltage, generator, or other power supply), drive motor 14, control input or output (e.g., connection to potentiometer 18), sensor input, or other external connections or devices. For example, a wire or cable that connects an electrical connector 28 with an external connection or device may pass through control housing 26 via a cable opening 38.

In some cases, control card 34 may include one or more communications connectors 31 (e.g., RJ45 connector or other type of connector), e.g., for enabling a wired connection to an external device (e.g., portable computing device). For example, the external device may be used to input calibration or other parameters to automatic door control 10. Automatic door control 10 may be configured to output data, such as a current position of the door, to an external device via communications connector 31.

In some cases, automatic door control 10 may be provided with one or more indicator lights (e.g., light-emitting diodes or other types of light sources) or other types or indicators. Such indicators may be configured to indicate one or more statuses of automatic door control 10. Such statuses may include, for example, power on or off, a detected fault, a clockwise or counterclockwise limit of rotation of main transmission shaft 16 (e.g., as determined by a manual contact switch, or by measuring a resistance of potentiometer 18), a mode of operation (e.g., automatic or manual), or another status.

Automatic door control 10 may be incorporated into an automatic door control system.

Figure 3:
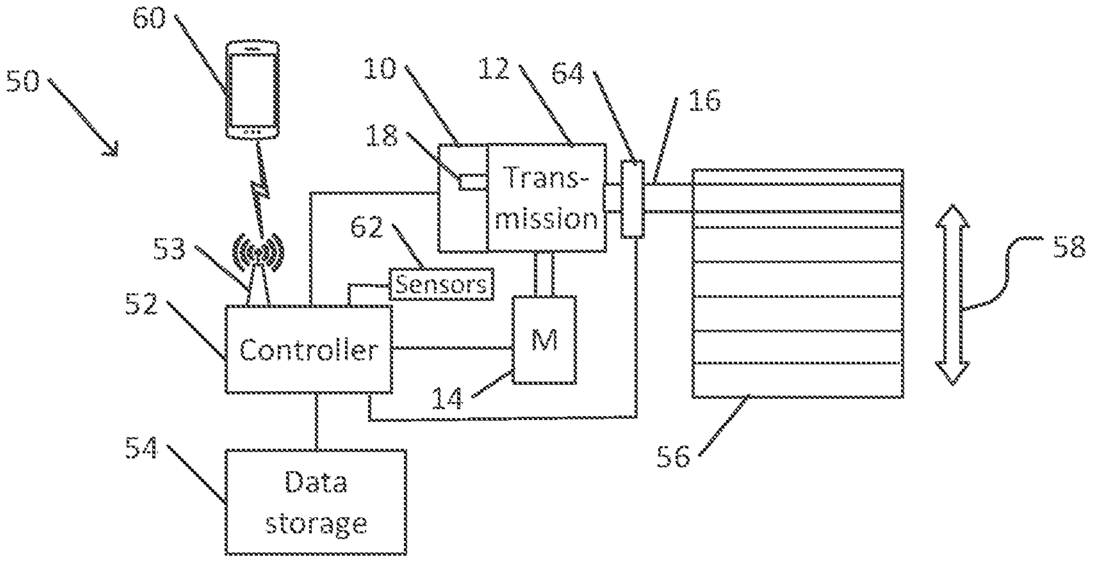
FIG. 3 schematically illustrates an automatic door control system that incorporates the automatic door control shown in FIG. 1A.

FIG. 3 schematically illustrates an automatic door control system that incorporates the automatic door control shown in FIG. 1A.

Automatic door control system 50 is configured to automatically control opening and closing of door 56. Drive motor 14 may be operated by controller 52 to rotate main transmission shaft 16 via transmission 12. Controller 52 may include one more components (e.g., microprocessor or micro-controller chips) that are mounted on control card 34, on drive motor 14, in a housing that is external to control housing 26, or elsewhere. On-off circuitry for enabling controller 52 to provide or cut off electrical power to drive motor 14 may include relays (e.g., due to the large electrical currents that may be used to operate drive motor 14).

Controller 52 may control a speed of rotation and direction of rotation of drive motor 14. Alternatively or in addition, controller 52 may control one or more components of transmission 12 (e.g., by operating a clutch or selection of a gear of a gear box, or otherwise) to control rotation of main transmission shaft 16.

For example, rotation of main transmission shaft 16 may move door 56 with a door motion 58 to open or close door 56. Rotation of main transmission shaft 16 in one direction may open (e.g., raise, in the example shown) door 56, and while rotation of main transmission shaft 16 in the opposite direction may close (e.g., lower, in the example shown) door 56. For example, door 56 may be a roller door or roller shutter that is rolled around main transmission shaft 16 when rotated in one direction to open door 56, and is unrolled from main transmission shaft 16 when rotated in the opposite direction. Alternatively or in addition, rotation of main transmission shaft 16 may operate a gear, pulley, or other mechanism to raise or lower door 56 with door motion 58.

Although, in the example shown, door 56 is opened and closed by raising and lowering, a door 56 may be opened or closed by horizontal motion in opposite directions, or by horizontal or vertical rotation in opposite directions. For example, a mechanism for opening or closing door 56 by horizontal or rotational motion may include a gear, pulley, or other mechanism to enable rotation of main transmission shaft 16 to open or close door 56.

Controller 52 may include one or more micro-controllers, processors, or other components or circuitry that are configured to control motion (e.g., opening and closing) of door 56 in accordance with one or more input signals. Input signals may be generated by, for example, automatic door control 10 and one or more sensors 62.

Controller 52 may incorporate or may communicate with data storage 54. Data storage 54 may include one or more nonvolatile fixed or removable, local or remote, data storage devices. Data storage 54 may be utilized to store programmed instructions for operation of controller 52 (e.g., a processor of controller 52), calibration data (e.g., relating a resistance of potentiometer 18 with a position of door 56), one or more target positions of door 56), threshold or range data (e.g., a threshold value or range of values of a sensed condition for triggering a change in the target position of door 56), an identification of one or more external devices that are authorized to communicate with controller 52 (or to enter or modify data that is stored in data storage 54), or other data.

An input signal from automatic door control 10 may be indicative of a current position of door 56. In some cases, the input signal may also be processed to calculate a current rate of change of the position of door 56. Controller 52 may compare the input signal with a stored or calculated value that is indicative of a target position of door 56 in order to determine whether main transmission shaft 16 is to be rotated (e.g., by operating drive motor 14), or whether rotation of main transmission shaft 16 is to stop (e.g., by ceasing operation of drive motor 14).

An input signal from one or more sensors 62 may be indicative of one or more sensed conditions that affect a target position of door 52. Fr example, sensors 62 may include one or more of thermometer, humidity sensor, clock, light sensor, anemometer, precipitation sensor, or other sensor. A sensed condition may include a time of day, a date, an internal temperature (e.g., inside a structure that includes door 52), an exterior temperature (e.g., in the ambient atmosphere surrounding the structure that includes door 52), an interior or exterior relative humidity, rate of insolation, wind velocity (e.g., speed, direction, or both), concentration of a substance (e.g., concentration of a pollutant or other particulate or chemical substance in the air within the structure), operation of a ventilation or air-conditioning system, precipitation, or another sensed condition.

Sensors 62 may include one or more sensors for sensing operation of drive motor 14 or other electrical components of automatic door control system 50. For example, sensors 62 may monitor one or more of current or current overload, voltage, electrical power, torque, temperature and overheating of drive motor 14 or of transmission 12, wiring and connection to the main power supply (e.g., voltage or current), or other properties of electrical components of automatic door control system 50. Sensors 62 may include one or more force, pressure, or proximity sensors to sense a position of one or more parts of door 56 relative to a floor or frame of door 56. Thus, automatic door control system 50 may include an emergency backup system. For example, automatic door control system 50 may be configured to cut off the power supply to drive motor 14 if a fault is detected (e.g., power, voltage, or current overload, excessive temperature, faulty communication between components, overshooting (e.g., door 56 not stopping at a predefined maximum open or closed position), or other indication of faulty operation of one or more components of automatic door control system 50 (e.g., resulting from improper installation or configuration, malfunction of one or more components, or mechanical or electrical interference with operation of one or more components of automatic door control system 50).

Automatic door control system 50 may include an encoder 64 (e.g., an optical or magnetic encoder) to measure rotation of one or more rotatable elements. e.g., of main transmission shaft 16 (as in the example shown), drive motor 14, potentiometer pulley wheel 20, transmission 12, or of another rotatable element whose rotation is indicative of motion of door 56. For example, encoder 64 may be configured to monitor movement, or a relative position of, main transmission shaft 16 or of door 56 during uninterrupted operation. In this case, the resistance of potentiometer 18 may be used, under normal operating conditions, to determine an absolute position at the beginning of operation, after a power outage, or under other circumstances when an absolute position is to be determined (e.g., to establish a reference point so as to relate a rotation that is measured by encoder 64 to a position of door 56).

Contoller 52 may be configured to compare a signal from one or more sensors 62 with one or more threshold values or ranges stored in data storage 54. For example, if a sensed temperature exceeds a threshold value or falls in a predetermined range, controller 52 may be configured to operate drive motor 14 while monitoring potentiometer 18 to open door 56 to a predetermined opening. Similarly, if a sensed temperature falls below a threshold value, or if the intensity of sunlight falls below a threshold value, a time of day indicates nightfall, controller 52 may be configured to operate drive motor 14 while monitoring potentiometer 18 to close door 56, either completely or to a predetermined opening.

Controller 52 may be provided with one or more wireless communications links 53 for communicating wirelessly with an external device 60. For example, wireless communications link 53 may operate using one or more communications technologies such as Bluetooth, Wi-Fi, or another wireless communication technology or channel. External device 60 may include a smartphone, a stationary or portable computer or communications device, a remote workstation, or another device that includes or communicates with one or more user-operable input devices, one or more output devices, or both. An external device 60 may be identified by, and may be authenticated or authorized to interact with automatic door control system 50. e.g., by a unique application or identification code (e.g., a service set identifier, or SSID) that is programmed into external device 60.

For example, external device 60 may be operated to set limits to operation of door 56 (e.g., maximally open and maximally closed positions, one or more intermediate positions) or other setup parameters (e.g., sensor readings for triggering start or abort of operation of door 56). In this manner, automatic operation of automatic door control system 50 may be configured without for physical access to control housing 26 (which may be located at a height or location to which access is inconvenient).

Wireless communications link 53 may be used to transmit a current status of automatic door control system 50 (e.g., position of door 56 or of main transmission shaft 16, motor operation, fault status, or other status information) to external device 60 (e.g., a remote station monitoring operation of one or more automatic door control systems 50).

Automatic door control system 50 may be configured to enable manual operation or override of automatic operation of automatic door control system 50. For example, manual operation may be required prior to performing a setup of parameters of automatic door control system 50, when corruption of stored values is suspected, or when unusual or unexpected environmental conditions are present (e.g., unusual patterns of weather or environmental pollution). For example, manual operation may be selected by operation of a switch 30, or otherwise. Another switch 30 or other control may be operated to manually open or close door 56.

Controller 52 may be configured to execute a method for automatic door control. For example, programmed instructions for execution of a method for automatic door control may be stored on data storage 54.

Figure 4:
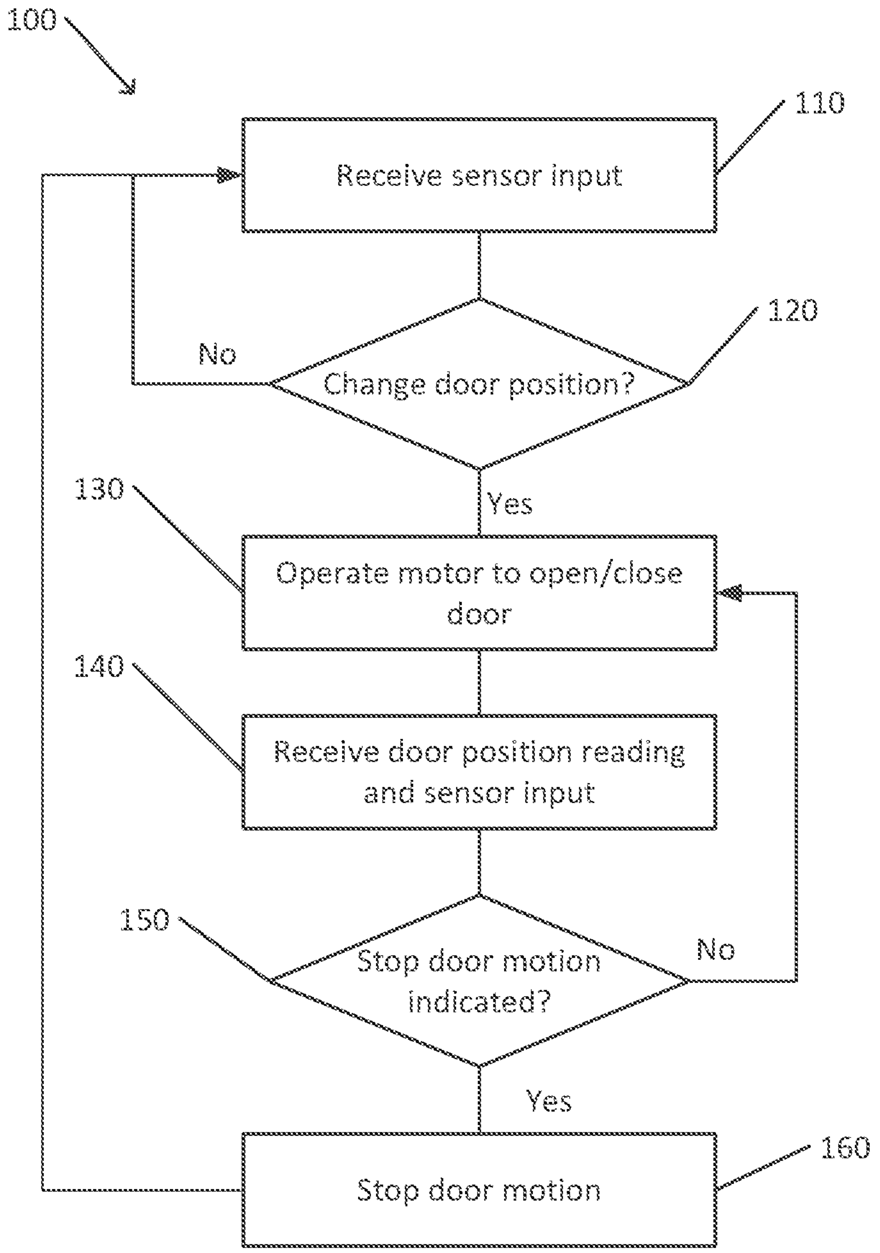
FIG. 4 is a flowchart depicting a method for automatic door control, in accordance with an embodiment of the present invention.

FIG. 4 is a flowchart depicting a method for automatic door control, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Automatic door control method 100 may be executed by controller 52 of automatic door control system 50. For example, automatic door control method 100 may be executed continuously while automatic door control system 50 is operating in an automatic mode (e.g., as selected by operation of a switch 30, via operation of external device 60, or otherwise). Alternatively or in addition, automatic door control method 100 may be executed in response to one or more sensed conditions (e.g., during predetermined hours of the day, days of the week, dates, or one or more sensed environmental or internal conditions), in response to an operator command, or otherwise.

Automatic door control method 100 includes receiving an input signal from one or more sensors 62 (block 110). The received sensor signals may indicate a status of one or more components of automatic door control system 50 (e.g., of drive motor 14, of a power supply, of transmission 12, or of another component of automatic door control system 50), one or more environmental conditions (e.g., interior or exterior temperature, humidity, brightness, wind or air circulation, or another environmental condition), or other sensed quantities.

The received sensor signals may be analyzed in accordance with one or more criteria to determine if a position of door 56 is to be changed to a target position that is different from the current position of door 56 (block 120). A value that is indicated by a received sensor signal, or a calculated value that is based on one or more of the received sensor signals (e.g., calculated on the basis of a predetermined formula or algorithm), may be compared with one or more predetermined thresholds or ranges of values, or may be otherwise compared with one or more criteria. One or more criteria or algorithms may be applied to determine a target position of door 56.

For example, if an interior temperature exceeds a predetermined value, opening, or further opening, of door 56 from a current closed or partially open position to a target position with a wider opening of door 56 may be indicated. Similarly, opening of door 56 may be indicated when a received sensor signal indicates excessive interior humidity, excessive concentration of one or more components in the interior air, insolation that exceeds a threshold value (e.g., that is likely to warm the interior of the structure), a time of day (e.g., that corresponds statistically to warm interior temperature), or in response to other types of received signals. In some cases, indication for opening of door 56 may be conditional one or more additional sensed quantities. For example, when excessive interior temperature is indicated, opening of door 56 may be conditional on the exterior temperature being lower than the interior temperature, on a minimum wind velocity, or on another additional condition. Similarly, closing door 56 to a target position where door 56 is completely or partially closed may be indicated when sensed conditions are indicative of an interior temperature that is below, or that is expected to drop below, a threshold temperature or lower end of a temperature range.

If no change in door position are indicated, sensor signal continues to be received and analyzed (return to block 110).

If a change in door position is indicated, drive motor 14, transmission 12, or both may be operated to open or close door 56 from its current position toward a target position (block 130). For example, drive motor 14, transmission 12, or both may be operated to rotate main transmission shaft 16 in a selected direction of rotation that causes door 56 to open or close as required in order to effect that indicated change in position.

While door 56 is being opened or closed, a sensed indication of the positions of door 56 may be received (block 140).

For example, control card 34, controller 52, or another component of automatic door control system 50 may include circuitry that is configured to produce a voltage or current that is indicative of a resistance of potentiometer 18 (e.g., between a sliding contact or wiper of potentiometer 18 and an end of a resistor of potentiometer 18). The sensed resistance of potentiometer 18 may be indicative of a current total rotation angle (which may be greater than 360° or less than zero or −360°) of main transmission shaft 16. The current total rotation angle of main transmission shaft 16 may be indicative of a current position of door 56 (e.g., an opening distance between an end of door 56 and an threshold or side of opening within which the end of door 56 is configured to be raised or lowered, or moved horizontally, an opening angle of door 56 relative to a plane of a doorway relative to which door 56 is configured to rotate or swing, a fraction of a maximum opening distance or angle, or otherwise measured). For example, a calibration procedure that is executed prior to execution of automatic door control method 100 may correlate between one or more measured resistances or other values of potentiometer 18 and one or more positions of door 56.

Alternatively or in addition, motion or a current position of door 56 may be sensed by encoder 64. For example, encoder 64 may generate a signal in the form of pulses that are indicative of rotation of main transmission shaft 16 or another rotating component (e.g., through a predetermined angle increment). The signal may be received by an appropriate connector of controller 52.

The position of door 56 that is indicated by the reading of potentiometer 18 or encoder 64 may be compared with the target position, or signals from sensors 62 may be analyzed, to indicate whether stopping of motion of door 56 is indicated (block 150).

If the position of door 56 is not yet at the target position, and signals from sensors 62 are not indicative of a fault in operation of automatic door control system 50 (or another change in sensed conditions), opening or closing of door 56 continues while continuing to receive readings from potentiometer 18 and from sensors 62 (return to block 130).

If the position of door 56 is at the target position, or if input from sensors 62 indicate a fault or other change in conditions (e.g., a sudden change in temperature or another environmental condition) that warrants aborting motion of door 56, opening or closing motion of door 56 is stopped (block 160). For example, electrical power to drive motor 14 may be interrupted, a clutch mechanism of transmission 12 may be operated to disengage drive motor 14 from main transmission shaft 16, or rotation of main transmission shaft 16 may otherwise be caused to cease.

Input signals from sensors 62 may then continue to be received and compared with criteria in order to determine whether further movement of door 56 is indicated (return to block 110).

Prior to execution of automatic door control method 100, a calibration method may be performed.

Figure 5:
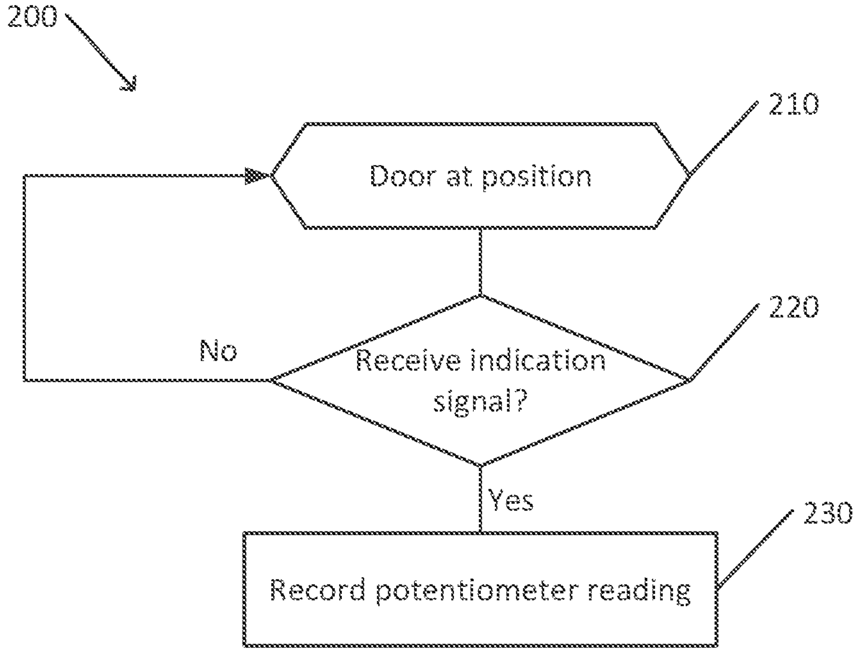
FIG. 5 is a flowchart depicting a calibration method for an automatic door system, in accordance with an embodiment of the present invention.

FIG. 5 is a flowchart depicting a calibration method for an automatic door system, in accordance with an embodiment of the present invention.

Calibration method 200 may be executed by controller 52 of automatic door control system 50. For example, calibration method 200 may be executed upon initially setting up automatic door control system 50, when an operator indicates (e.g., via operation of a switch 30, via operation of external device 60, or otherwise) an intention to calibrate automatic door control system 50, when the absence of a stored calibration value is detected, or otherwise.

In preparation for execution of calibration method 200, door 56 may be manually operated to a particular position (block 210). For example, the position may be a fully open position, a fully closed position, or an intermediate position.

When the door is at the position, an indication signal may be received (block 2201. For example, the signal may be received from external device 60, from a control of automatic door control 10 (e.g., a switch 30), or another user-operable control of automatic door control system 50.

If no signal is received, the door may be moved to another position (return to block 210).

If a signal is received, the current reading (e.g., resistance) of potentiometer 18 may be recorded (block 230). For example, the potentiometer reading, together with an indicated (e.g., operator identified) position of door 56 (e.g., fully open, fully closed, one or more labeled intermediate positions) may be stored in data storage 54.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An automatic door opening system comprising:
- an element that is rotatable to change a position of a door;
- a potentiometer that is coupled to the element such that rotation of the element in one direction increases a resistance of the potentiometer and rotation of the element in the opposite direction decreases the resistance; and
- a controller that is configured to rotate the element concurrently with monitoring the resistance of the potentiometer, and to stop the rotation when the resistance of the potentiometer is indicative of a target position of the door.

2. The system of claim 1, wherein the element comprises a shaft.

3. The system of claim 2 wherein a housing of the controller includes an opening to enable an end of the shaft to extend into the housing.

4. The system of claim 3, wherein the end of the shaft includes a pulley wheel and a shaft of the potentiometer is provided with a pulley wheel, the rotatable element being coupled to the potentiometer by a pulley belt.

5. The system of claim 1, further comprising at least one sensor.

6. The system of claim 5, wherein the controller is configured to select the target position based on a signal from said at least one sensor.

7. The system of claim 6, wherein the sensor is configured to sense an environmental condition.

8. The system of claim 7, wherein the environmental condition comprises an interior or exterior temperature or an interior or exterior humidity.

9. The system of claim 5, wherein the system is configured to stop rotation of the rotatable element in response to a signal from said at least one sensor.

10. The system of claim 9, wherein the signal is indicative of faulty operation of the system.

11. The system of claim 1, further comprising an encoder for sensing a rotation of the element.

12. The system of claim 11, wherein the controller is further configured to rotate the element when a signal that is generated by the encoder is indicative of a target position of the door.

13. The system of claim 1, wherein the controller is provided with a nonvolatile data storage that is configured to store a correlation between a target position of the door and a resistance of the potentiometer.

14. The system of claim 1, wherein the controller is configured to receive a signal during execution of a calibration method, the signal indicating that a current resistance of the potentiometer corresponds to the target position.

15. The system of claim 1, wherein the controller is configured for wireless communication wirelessly with an external device.

16. The system of claim 15, wherein the wireless communication comprises Bluetooth or Wi-Fi.

17. The system of claim 15, wherein the external device comprises a smartphone.

18. The system of claim 15, wherein the wireless communication is configured to enable an operator or the external device to indicate a correlation between a current resistance of the potentiometer and the target position of the door.

19. A method for operation of an automatic system for changing a position of a door, the method comprising, by a controller:
- receiving input from a sensor,
- when the input is indicative of changing the position of the door to a target position:
  - operating a motor to rotate a rotatable element in one direction to open the door, or in an opposite direction to close the door;
  - concurrently with operating the motor, receiving a reading of a potentiometer that is coupled to the rotatable element rotation, where rotation of the element in one direction increases a resistance of the potentiometer and rotation of the element in the opposite direction decreases the resistance; and
  - stopping the rotation when the resistance of the potentiometer is indicative of the target position of the door.

20. An automatic door opening system comprising:
- an element, wherein rotation of the element corresponds to a change in a position of the door;
- an encoder configured to sense a rotation of the element and generate a signal indicative of the sensed rotation; and
- a controller that is configured to control the rotation of the element concurrently with monitoring the signal, and to stop the rotation when the signal is indicative of a target position of the door.

21. The system of claim 20, further comprising a potentiometer that is coupled to the element such that rotation of the element in one direction increases a resistance of the potentiometer and rotation of the element in the opposite direction decreases the resistance, wherein the controller is configured to monitor the resistance of the potentiometer, and to stop the rotation when the resistance of the potentiometer is indicative of a target position of the door.

* * * * *